United States Patent [19]

Matsuzaki et al.

[11] 3,987,468

[45] Oct. 19, 1976

[54] APPARATUS FOR SYNCHRONIZING AN ELECTRONIC FLASH WITH A CAMERA

[75] Inventors: Soichiro Matsuzaki, Mitaka; Yoshihisa Maitani, Hachioji; Kunio Shimoyama, Hachioji; Isao Kondo, Hachioji, all of Japan

[73] Assignee: Olympus Optical Co., Ltd., Tokyo, Japan

[22] Filed: Sept. 11, 1974

[21] Appl. No.: 504,856

[30] Foreign Application Priority Data

July 2, 1974 Japan................................ 49-75693

[52] U.S. Cl................................ 354/145; 354/146; 354/147
[51] Int. Cl.²........................................ G03B 15/03
[58] Field of Search............ 354/34, 129, 137, 138, 354/145, 146, 147

[56] References Cited
UNITED STATES PATENTS

| | | | |
|---|---|---|---|
| 2,643,597 | 6/1953 | Suzukawa | 354/146 |
| 2,682,815 | 7/1954 | Gasser | 354/146 |
| 2,930,298 | 3/1960 | Suzukawa | 354/146 |
| 3,326,103 | 6/1967 | Topaz | 354/34 |
| 3,502,012 | 3/1970 | Takeuchi | 354/34 |

*Primary Examiner*—Russell E. Adams, Jr.
*Attorney, Agent, or Firm*—Ostrolenk, Faber, Gerb & Soffen

[57] ABSTRACT

An apparatus for activating an electronic flash by operating an X contact when the first blind of a focal plane shutter has terminated its movement to fully open an exposure light path, irrespective of an exposure period establishing operation. Where an electronic focal plane shutter is combined with an autostrobo, a photometric circuit within the electronic circuit is used to measure the radiation from the autostrobo, and to control the amount of exposure to a proper value. Where a proper amount of exposure is available by natural light when the shutter is opened, a closing movement of the shutter is utilized to cause the trigger capacitor of the electronic flash to be discharged, thereby disabling the illumination of the electronic flash.

11 Claims, 10 Drawing Figures

FIG. 1
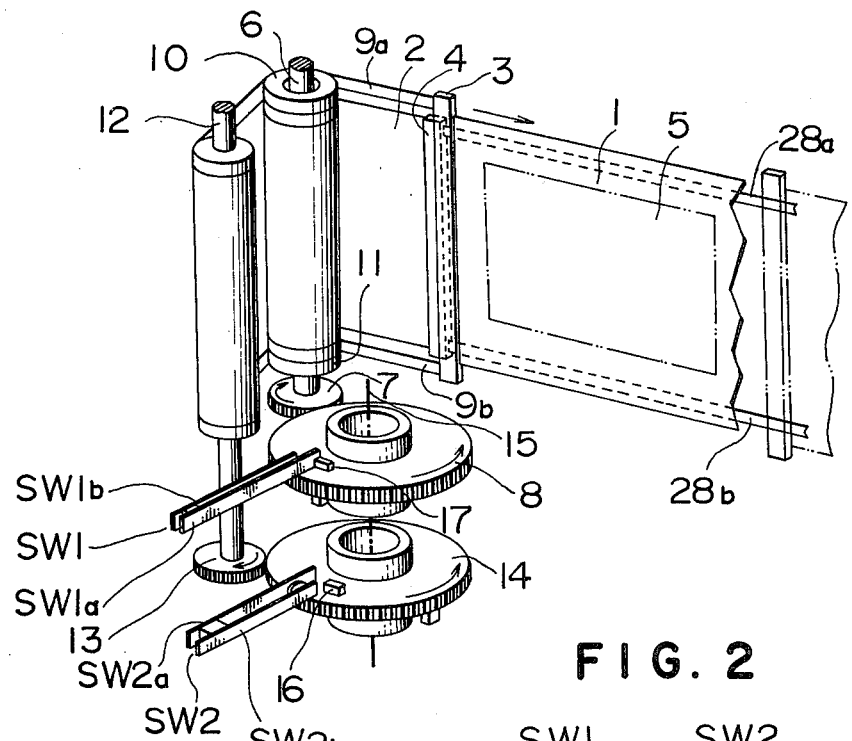
FIG. 2
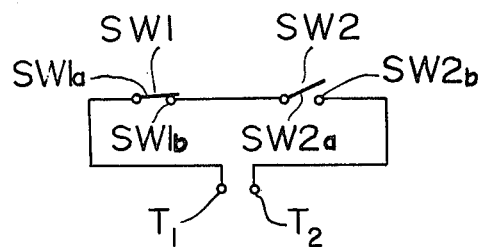
FIG. 3
| | SW1 | SW2 |
|---|---|---|
| FOR EXPOSURE PERIOD GREATER THAN 1/60 SECOND | ▨▨▨▨▨▨▨▨ | ▨▨▨▨ |
| FOR EXPOSURE PERIOD LESS THAN 1/60 SECOND | ▨▨▨ | ▨▨▨▨ |

APPARATUS FOR SYNCHRONIZING AN ELECTRONIC FLASH WITH A CAMERA

BACKGROUND OF THE INVENTION

The invention relates to an apparatus for synchronizing an electronic flash with a camera including a focal plane shutter for the purpose of taking a picture under flashlight. When an electronic flash is used to take a picture under flashlight with a camera including a focal plane shutter, the synchronizing contact must be changed to the X contact. Simultaneously, the exposure period must be previously controlled so that a shutter speed or exposure period assumes a value at which a synchronized flashlight photographing is possible (which is referred to hereinafter as X-period), which is usually set to be greater than 1/125 to 1/60 second. Such value of the shutter speed corresponds to an exposure period which is defined from the termination of movement of the first blind of the shutter to fully open an exposure light path until the second blind moves to close the open exposure path. Such pre-establishing of the shutter speed is necessary because a focal plane shutter employs a slitwise exposure while an electronic flash represents a source of flashlight having a very short duration. If a picture is taken with a shutter speed established on the order of 1/250 second or the like, only one-half or one quarter of the scene to be photographed will be irradiated by the flashlight. This explains why the shutter speed must be established to an X-period. However, it often occurs that a photographer forgets to set the shutter speed to correspond to an X-period when taking a picture under flashlight, and becomes aware of this fact only after the exposed film is developed.

When using an electronic flash to take a picture under synchronized flashlight, it is known that the intensity of reflected light from an object being photographed varies as the distance between the camera and the object varies, thereby necessitating an adjustment of the diaphragm each time a picture is taken. To avoid such inconveniences, an adjusted flashlight emitter referred to as auto-strobo has been recently developed. This comprises a flash tube bypassed by a discharge tube in combination with a photometric circuit which is operative, upon illumination of the flash tube, to measure reflected light from an object being photographed and to cause a discharge of the discharge tube when the amount of light being measured reaches a proper amount of exposure, thus short-circuiting the flash tube to interrupt its operation and thus assuring a proper exposure. As is well known, an EE camera includes its own photometric circuit, which however is not used when the above mentioned auto-strobe is used to take a picture under flashlight.

Another difficulty occurs with the combination of the auto-strobo and an EE camera having an electronic focal plane shutter. The illumination of the strobe is controlled by the X contact which is closed by the operation of the shutter within the EE camera, which is in turn controlled by the EE circuit. Specifically, a release operation of the shutter causes the first blind of the shutter to move, and the X contact is closed when the photographic path becomes open. As the reflected light from an object being photographed reaches a proper amount of exposure, an electromagnet which has been constraining the second blind of the shutter from moving is deenergized to permit movement of the second blind, thus terminating a photographing operation. The arrangement is such that if a given amount of exposure has been reached by natural light before the X contact is closed, an inhibit signal is applied to the strobo unit. However, depending on the relative timing of the inhibit signal generated and the closure of the X contact, the X contact may be closed to cause an illumination of the strobo unit. At this time, since the second blind of the shutter has already moved into the photographic path, vignetting is caused on the film surface by the presence of the second blind, thus resulting in a failure of synchronization.

SUMMARY OF THE INVENTION

It is a first object of the invention to provide an apparatus for synchronizing an electronic flash with a camera having a focal plane shutter capable of instantly providing an indication to a photographer, when taking a picture under synchronized flashlight, whether or not a shutter speed value within the X-period range has been extablished to cause a synchronized flashlight photographing, by merely recognizing the illumination or non-illumination of the electronic flash subsequent to the depression of a shutter button.

As a result, in accordance with the invention, if a shutter speed is established to a value which is on the higher speed side of the X-period, no circuit is completed to cause an illumination of the electronic flash, so that if a photographer attempts to take a picture under flashlight without establishing the shutter speed to an X-period, no flash will be produced by the electronic flash, thus warning the photographer in a simple manner. In other words, the arrangement is such that the electronic flash can not be activated unless a shutter speed within the X-period range is established. Consequently, the photographer can be immediately informed whether or not a shutter speed within the X-period range is established, by merely taking notice of the illumination or non-illumination of the electronic flash, thus avoiding the inconvenience that the photographer may continue to take the pictures on the entire roll of film without knowing the failure of establishing an X-period, which he becomes aware of only after developing the exposed film.

It is a second object of the invention to provide an apparatus for synchronizing an electronic flash with a camera having an electronic focal plane shutter, which permits the illumination from the electronic flash to be controlled by a photometric circuit within the shutter. This permits a photometric circuit, which has usually been incorporated into an electronic flash as in the autostrobo, to be dispensed with, while assuring a proper amount of exposure under flashlight. Also the size of the electronic flash used can be minimized while at the same time improving the efficiency of use of the photometric circuit within the camera.

It is a third object of the invention to provide an apparatus for synchronizing an electronic flash with a camera having an electronic focal plane shutter in which the illumination of the electronic flash is prevented when a proper amount of exposure is reached by natural light before the electronic flash is to be illuminated while permitting the electronic flash to be illuminated in the event a given amount of exposure is not reached at the time when the X contact is to be closed.

In accordance with the invention, if a given amount of exposure is reached by natural light before the electronic flash is to be illuminated, a signal is derived from the electromagnet which controls the movement of the second blind of the shutter to discharge a trigger capacitor for the electronic flash before the X contact is closed, thus disabling the illumination of the electronic flash. In this manner, an asyncronous photographing is avoided.

It will be appreciated that the invention enables a satisfactory photograhing operation under synchronized flashlight to be achieved while requiring of a photographer only the operations of coupling the electronic flash with the camera and depressing a release button to confirm the activation of flashlight. A synchronized photographing operation during daytime is also simplified.

BRIEF DESCRIPTION OF THE DRAWINGS

FIG. 1 is a perspective view of the X contact associated with the electonic flash of a focal plane shutter which may be used in the apparatus according to the invention;

FIG. 2 is a wiring diagram showing the electrical connection of the X contact of FIG. 1;

FIG. 3 is a sequence diagram showing the closure of switches SW1 and SW2 which constitute together the X contact;

DETAILED DESCRIPTION OF THE INVENTION

Figure 4:
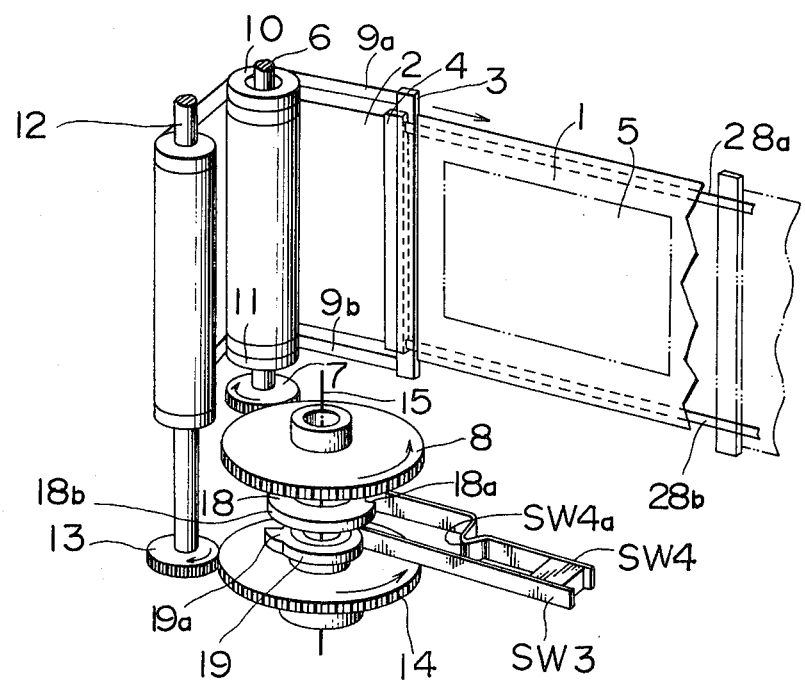
FIG. 4 is a perspective view showing another example of the X contact of a focal plane shutter which may be used in the apparatus according to the invention.

As shown in FIG. 1, a focal plane shutter comprises a first blind 1 and a second blind 2. As is well known, a slit forming member 3 is fixed to the trailing edge of the first blind 1 and a slit forming member 4 is fixed to the forward edge of the second blind 2 to thereby form a slit which is moved across an exposure window 5 to permit an exposure. The trailing edge portion of the second blind 2 is fixedly mounted on a winding shaft 6 on which a gear 7 is fixedly mounted. The gear 7 meshes with a gear 8 of a larger diameter. The slit forming member 3 which is fixed to the trailing edge of the first blind 1 has a pair of traction strings 9a, 9b secured to its upper and lower end portions, which strings are passed around guide pulleys 10, 11, rotatably mounted on the winding shaft 6, and secured to a first blind winding shaft 12. A gear 13 is fixedly mounted on the winding shaft 12, and meshed with a gear 14 of a larger diameter. The gears 8 and 14 having a larger diameter are rotatably mounted on an axle 15, and the arrangement is such that the gear 14 undergoes nearly one revolution in the direction indicated by an arrow as the slit forming member 3 traverses across the exposure window 5 when the first blind 1 moves, while the gear 8 undergoes nearly one revolution about the axle 15 in the direction indicated by an arrow as the slit forming member 4 traverses across the exposure window 5 in following relationship with respect to the member 3. These larger diameter gears 8 and 14 serve to wind the first and second blinds 1, 2 onto their respective winding shafts 6 and 12, respectively upon completion of taking a picture, by being integrally rotated through one revolution about the axle 15 in interlocked relationship with a film winding operation. When both blinds 1 and 2 are wound, a shutter drive spring, not shown, is charged.

The width of the slit defined between the slit forming members 3 and 4 is determined by the relative timing of movement of the second blind 2 with respect to that of the first blind 1, which is in turn established in accordance with a preset exposure period.

As mentioned previously, the gear 14 undergoes nearly one revolution as the slit forming member 3 traverses across the exposure window 5, and the gear 8 undergoes one revolution as the slit forming member 4 traverses across the exposure window 5 to close an exposure light path. Thus it will be seen that the exposure path which passes through the exposure window 5 remains fully open after one revolution of the gear 14 and before the gear 8 initiates its rotation. A statisfactory synchronization is assured for taking a picture under flashlight if the flashlight is activated under the open condition of the exposure window.

In accordance with the invention, the synchronizing contact or X contact comprises a first switch which is closed when the exposure light path is fully open as a result of movement of the first blind 1, and a second switch which is opened as the second blind 2 initiates its movement in order to close the open exposure light path. Specifically, a tab 16 is disposed on the gear 14, and a movable contact SW2a of a normally open switch SW2 is located in the path of travel of the tab 16 which operates as a switch control member. Similarly, a tab 17 which operates as a switch control member is disposed on the gear 8, and a movable contact SW1a of a normally open switch SW1 is located within the path of travel of the tab 17. When the second blind 2 is wound by a film winding operation, the tab 17 bears against the movable contact SW1a to move it into contact with a fixed contact SW1b, thus closing the normally open switch SW1. As shown in FIG. 2, the switches SW1 and SW2 are connected in series between terminals T1 and T2 to constitute the X contact for an electronic flash.

With the X contact as contsructed in this manner, when the shutter is charged in interlocked relationship with the winding of a film, the gears 8 and 14 rotate clockwise about the axle 15 through nearly one revolution, whereby the tab 17 on the gear 8 bears against the movable contact SW1a to close the switch SW1 while the tab 16 on the gear 14 remains at a position close to but spaced from the movable contact SW2a. When a shutter speed is established to a value within the X-period range, the first blind 1 will move in the direction indicated by an arrow upon shutter release, thereby fully opening the exposure window 5. When the exposure path is fully open, gear 14 will have rotated about the axle 15 through one revolution, whereby the tab 16 bears against the movable contact SW1a to move it into engagement with a fixed contact SW2b, thus closing the switch SW2. Since the switch SW1 is already closed, the closure of the switch SW2 results in a closure of the X contact, thus illuminating the electronic flash to permit a photographing under synchronized flashlight. Upon lapse of an established exposure period, the second blind 2 commences its movement, whereby the gear 8 rotates counter-clockwise about the axle 15, thus opening the switch SW1. The opening of the switch SW1 occurs immediately before the slit forming member 4 associated with the second blind 2 moves into the open exposure path. When the switch SW1 is opened, the X contact remains open even though the switch SW2 may be closed. It will be appreciated that the X contact comprising both switches SW1 and SW2 is closed only when a shutter speed or an exposure period within the X-period is established. Stated differently, if an exposure period greater than the X-period is established, it is assured that the both switches SW1 and SW2 will be closed as shown in FIG. 3 when the exposure path is fully open. The illumination of the electronic flash under this condition ensures a completely synchronized flashlight photographing. In FIG. 1, characters 28a and 28b represent traction strings associated with the second blind 2.

While in the above described embodiment, the switches SW1 and SW2 which together constitute the X contact are opened and closed by gears which undergo a rotation through nearly one revolution in interlocked relationship with the running of the first and second blinds, it should be obvious that these switches may be directly operated by the first and second blinds 1 and 2, respectively. The only requirement is that the switch SW2 is closed when the first blind 1 has completed its movement to fully open the exposure light path while the other switch SW1 is opened immediately before the second blind 2 which has started running moves into the open exposure light path.

Figure 5:
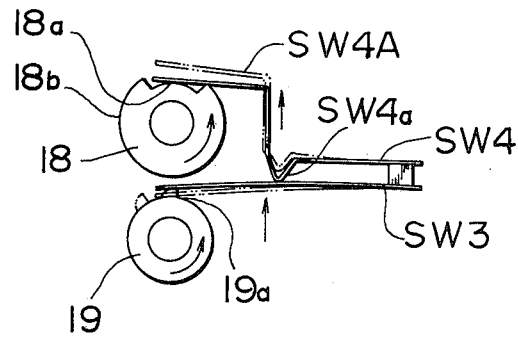
FIG. 5 is a plan view illustrating the operation of the X contact of FIG. 4.
Figure 6:
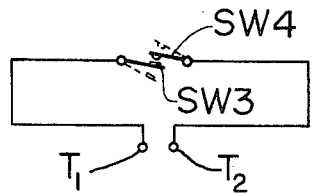
FIG. 6 is a wiring diagram showing the electrical connection of the X contact of FIG. 4.

FIGS. 4 to 6 show another embodiment of the X contact, and corresponding parts are designated by like reference characters as used in FIG. 1. In the embodiment shown in FIG. 4, the synchronizing contact or X contact comprises a pair of movable contacts, one of which is displaced into contact with the other in interlocked relationship with the movement of the first blind 1 as it runs to fully open the exposure light path, thereby closing the contact to cause an illumination of the electronic flash. Subsequently, when the second blind 2 initiates its movement in order to close the fully open exposure light path, the other movable contact is moved away from said one movable contact in interlocked relationship with the movement of the second blind 2, immediately before the second blind moves into the open exposure path; thus opening the previously closed contact.

Specifically, the X contact comprises a pair of independently movable blade contacts SW3 and SW4, both of which are formed of a resilient material. These blade contacts are disposed in opposing relationship with each other, and a bend SW4a formed in the movable blade contact SW4 and a mating portion of the movable blade contact SW3 form together a cooperating pair of electrical contacts. The movable blade contact SW4 is resiliently biased toward the movable blade contact SW3, while the latter is resiliently biased to move away from the other movable blade contact SW4. Both movable contacts SW3 and SW4 have their free ends extending adjacent to the axle 15 mentioned before. The movable blade contact SW4 is adapted to be displaced by a cam 18 which operates as a switch control member and is integrally mounted on the gear 8 while the movable blade contact SW3 is adapted to be displaced by a projection on a disc 19 which operates as a switch control member and is integrally mounted on the gear 14. The disc 19 is fixedly mounted on the boss of the gear 14, and rotates through nearly one revolution as the gear 14 rotates through nearly one revolution in the direction indicated by an arrow, with its projection 19a bearing against the movable blade contact SW3 to cause it to move toward the other movable blade contact SW4, thus closing the pair of electrical contacts mentioned above. The cam 18 is fixedly mounted on the boss of the gear 8 and comprises a planar cam having a portion of reduced diameter 18a, and in the charged position of the shutter, the free end of the movable blade contact SW4 bears against the portion of reduced diameter 18a of the cam 18, but as the gear 8 commences its rotation through one revolution, the remaining portion of the cam, shown at 18b, displaces the movable blade contact SW4, whereby the electrical engagement between the movable blades SW3 and SW4 is interrupted.

In operation, it is initially assumed that a shutter speed is established to define an exposure period which is within the X-period. Upon shutter release, the first blind 1 moves, and by the time it has fully opened the exposure light path, the gear 14 has undergone nearly one revolution, so that the projection 19a displaces the movable blade contact SW3 as shown in FIGS. 5 and 6 into engagement with the blade contact SW4 to complete a circuit path between terminals $T_1$ and $T_2$. Thus, the X contact is closed, and the electronic flash is activated under the fully open condition of the exposure light path, permitting a photographing operation under synchronized flashlight. Subsequently, when the established exposure period has elapsed, movement of the second blind 2 is initiated. As it begins to move, the movable blade contact SW4 which has been in abutment against the portion of reduced diameter 18a will be engaged by the remainder 18b of the cam 18 as it rotates together with the gear 8, whereby the blade contact SW4 will be displaced to a position SW4A shown in FIG. 5 in chain lines. This displacement moves the movable blade contact SW4 away from the other movable blade contact SW3, whereby the electrical contact therebetween is interrupted to open the X contact. It will be appreciated that the X contact will be closed only when an exposure period greater than the X-period is established in the similar manner as in the previous embodiment.

While in the above embodiment, the pair of movable blade contacts SW3 and SW4 which together constitute the X contact have been displaced by cam 18 and disc 19 having projection 192 and which are mounted on the gears 8 and 14, respectively, is should be understood that they may be directly moved by the first and second blinds 1 and 2, respectively. This may be achieved, for example, by utilizing the slit forming member 3 of the first blind 1 to urge one of the movable blade contacts SW3 into engagement with the other movable blade contact SW4 when this member has completed its movement and by utilizing the movement of the second blind 2 to move the movable blade contact SW4 away from the movable blade contact SW3 to open the X contact when the second blind 2 has initiated its movement. The only requirement is that one of the movable blade contacts, SW3, is moved into contact with the other movable blade contact SW4 when the first blind 1 has completed its running to fully open the exposure light path and the movable blade contact SW4 is moved away from the movable blade contact SW3 when the second blind 2 has initiated its movement to move into the open exposure light path.

Figure 7:
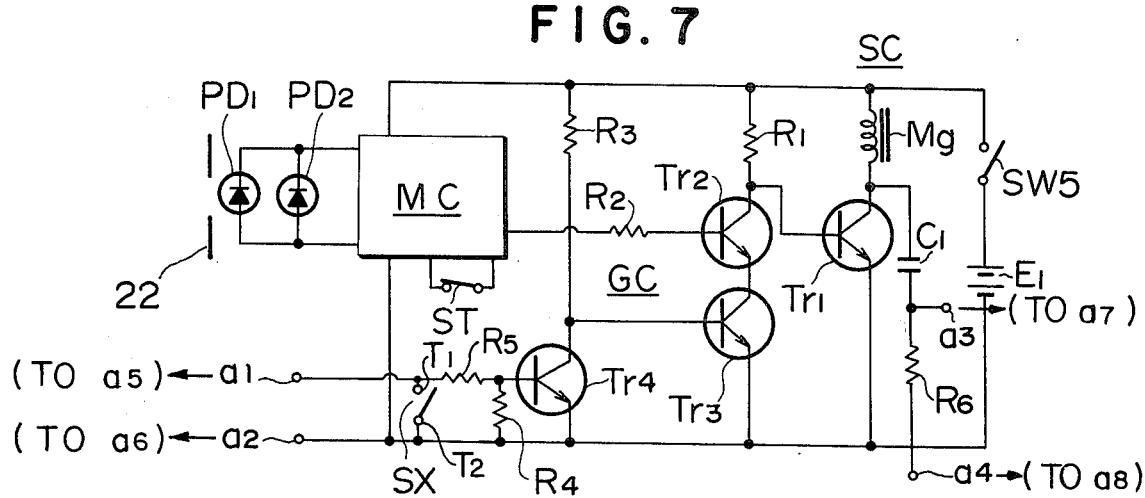
FIG. 7 is a circuit diagram of the photometric circuit and shutter control circuit of the electronic shutter contained within the camera associated with the apparatus of the invention.
Figure 8:
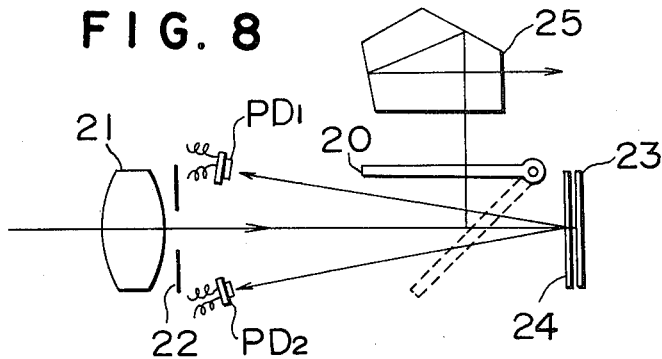
FIG. 8 is a schematic view of a camera having a TTL (through-the-lens) electronic shutter, illustrating the manner of incidence of light on a light receiving element contained in the photometric circuit of FIG. 7.

Referring to FIGS. 7 and 8, a control of the illumination of an adjusted strobo or auto-strobo by means of a photometric circuit contained within an electronic focal plane shutter, in particular an electronic focal plane shutter of TTL (through-the-lens) type, will now be described. Initially describing the arrangement on the side of a single lens reflex camera having an electronic focal plane shutter of TTL type which is not adapted to store a photometric value, FIG. 7 shows a photometric circuit MC which does not store a photometric value, a gate circuit GC and a shutter control circuit SC, connected in parallel with each other and connected through a power switch SW5 with a first d.c. power supply E1, the power switch being closed immediately in response to the initiation of a shutter release operation. The photometric circuit MC is conventional in that it comprises light receiving elements PD1 and PD2 such as photodiodes for receiving reflected light from an object being photographed (not shown), an integrator circuit and a switching circuit. The photometric operation is initiated by an opening of a trigger switch ST which is opened in synchronism with the opening movement of the shutter or the start of movement of the first blind of a focal plane shutter which is initiated in response to a shutter release operation with a time delay after the closure of the power switch SW5. The light receiving elements PD1 and PD2 of the photometric circuit MC are adapted to receive light incident upon a film 23 and the first blind 24 of the focal plane shutter having the same reflectivity as the film 23 as reflected therefrom, the light being incident on the film 23 through an objective 21 and a diaphragm 22 when a movable reflecting mirror 20 moves up in response to a shutter release operation as shown in FIG. 8. A pentaprism 25 is disposed for conducting light incident onto and reflected by the reflecting mirror 20 to a finder window, not shown, when the mirror 20 is set within the light path as shown by dotted lines.

The shutter control circuit SC comprises a first NPN transistor Tr1, the collector of which is connected in series with an electromagnet Mg. The electromagnet Mg locks the second blind of the focal plane shutter against movement when it is energized, and permits the second blind to move when it is deenergized. The transistor Tr1 is shunted by a differentiator circuit comprising a capacitor C1 and a resistor R6 connected in series, the resistor R6 being connected across a pair of terminals a3 and a4 which are adapted to apply a shutter closing signal to an electronic flash. The gate circuit GC comprises a pair of NPN transistors Tr2 and Tr3 connected in series, with a resistor R1 connected to the collector of the transistor Tr2 and to the power switch SW5, and an NPN transistor Tr4 which has its collector connected through a resistor R3 with the power switch SW5. The base of the transistor Tr3 is connected with the collector of the transistor Tr4. One input terminal, that is, the base of the transistor Tr2 is connected through a resistor R2 with the output terminal of the photometric circuit MC, and the other input terminal or the base of the transistor Tr4 is connected through a resistor R5 with a terminal a1. Another terminal a2 is connected with the emitter of the transistor Tr4, and the base and the emitter of the transistor Tr4 are interconnected by a resistor R4. An inhibit signal from the electronic flash is applied across these terminals. The output terminal of the gate circuit GC, or the collector of the transistor Tr2, is connected to a control signal input for the shutter control circuit SC, that is, the base of the transistor Tr1. A synchronizing contact or X contact SX which is closed when the first blind of the focal plane shutter has moved to fully open the exposure light path is connected across the terminals a1 and a2. Switch $S_X$ shows a simplified arrangement of the switch means of FIGS. 2 or 6, for example, which are shown as being connected between terminals $T_1$ and $T_2$.

Figure 9:
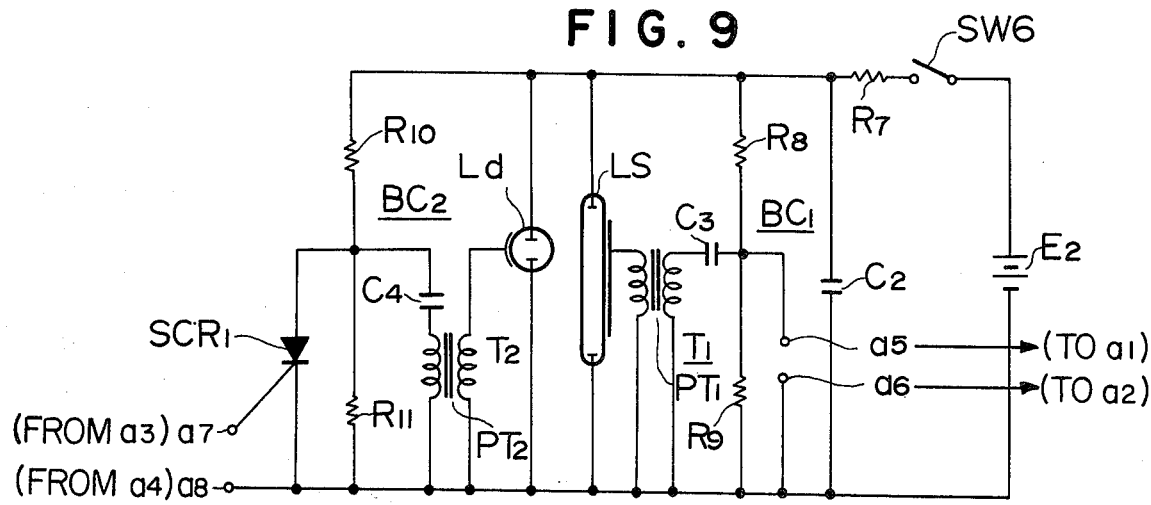
FIG. 9 is a circuit diagram of an exemplary adjusted strobo unit.

Referring to FIG. 9, the arrangement on the side of an adjusted strobo unit will be described. As shown, a second d.c. power supply E2 has its positive terminal connected through a power switch SW6 and a resistor R7 with one plate of a main capacitor C2, the other plate of which is connected directly with the negative terminal of the power supply E2. The capacitor C2 is shunted by a parallel combination of a flash discharge tube Ls and a bypass discharge tube Ld which are associated with trigger circuits T1 and T2, respectively. The first trigger circuit T1 comprises a voltage divider BC1 comprising a pair of resistors R8 and R9 connected in series across the flash discharge tube Ls, with the resistor R9 being shunted by a series circuit comprising a trigger capacitor C3 and the primary winding of a first pulse transformer PT1. The secondary winding of the first pulse transformer PT1 is connected across a trigger electrode associated with the flash discharge tube Ls and one of the main electrodes thereof. The resistor R9 has its opposite ends connected to a pair of terminals a5 and a6, across which the X contact SX is connected as a start switch. Thus, an inhibit signal is applied from the terminals a5, a6 to the base-emitter path of the transistor Tr4 in the gate circuit GC.

The second trigger circuit T2 comprises a voltage divider BC2 comprising a series connection of resistors R10 and R11 in shunt with the discharge tube Ld, with the resistor R11 being shunted by a series circuit comprising a capacitor C4 and the primary winding of a second pulse transformer PT2. The secondary winding of the second pulse transformer PT2 is connected across an auxiliary electrode and one of the main electrodes of the discharge tube Ld. The resistor R11 is also shunted by start switch which comprises a three terminal thyristor SCR1, which has its gate connected with a terminal a7 and its cathode connected with a terminal a8. The pair of terminals a7 and a8 are connected with the pair of terminals a3 and a4 in the shutter control circuit SC, whereby a shutter closing signal from the circuit SC may be applied to the gate of the thyristor SCR1 as an illumination interrupt signal.

With the above arrangement, an electronic flash is loaded on the camera and its terminals a5 and a6 connected with the terminals a1 and a2 of the camera. Also the terminals a7 and a8 are connected with the terminals a3 and a4. By closing the power switch SW6 of the electronic flash, the main capacitor C2 can be charged to a sufficient level to cause an illumination of the flash discharge tube Ls, and the capacitors C3 and C4 can also be charged. Thereupon, the terminal voltage across the resistor R9 will be applied as an inhibit signal across the base and emitter of the transistor Tr4 through the mating terminals a5–a1 and a6–a2.

When the shutter of the camera is released under this condition, the power switch SW5 will be closed together with the initiation of the release operation, whereby the transistor Tr4 having an inhibit signal applied to its base will be turned on to prevent conduction of the transistors Tr3 and Tr2 sequentially, which ultimately results in a conduction of the transistor Tr1. As a consequence, the electromagnet Mg will be energized, locking the second blind against movement. Subsequently, the reflecting mirror 20 will move up, followed by the initiation of movement of the first blind of the focal plane shutter, and the trigger switch ST will be opened in synchronism therewith, initiating the operation of the photometric circuit MC. When the first blind has run through its complete stroke or when the exposure light path is fully open, the X contact SX will be closed to turn off the transistor Tr4, whereby the resistor R9 in the trigger T1 is short-circuited, thus enabling the charge on the trigger capacitor C3 to be instantaneously discharged through the primary winding of the pulse transformer PT1. Thereupon, a high tension pulse will be induced across the secondary winding of the pulse transformer PT1 to trigger the flash discharge tube Ls into conduction, which therefore emits a flash. The flash from the tube Ls irradiates an object being photographed. Light reflected from the object being photographed impinges through the objective 21 and diaphragm 22 of the camera onto the film 23, thus allowing an exposure thereof, and is also reflected by the film 23 to impinge upon the light receiving elements PD1 and PD2 of the photometric circuit MC which is then operating.

When a photometric value reaches a proper amount of exposure, the photometric circuit MC produces a shutter closing signal, which is applied to the base of the second transistor Tr2 for turning Tr2 on. Since the transistor Tr4 is already turned off thereby conditioning the transistor Tr3 to be ready to be turned on, the shutter closing signal permits the both transistors Tr2 and Tr3 to conduct simultaneously, thus rendering the first transistor Tr1 non-conductive. As a result, a pulse signal is developed across the terminals a3 and a4 of the differentiator circuit, and is applied through terminals a7 and a8 to the gate-cathode path of the thyristor SCR1 to cause its conduction. The conduction of the thyristor SCR1 causes the capacitor C4 of the trigger circuit T2 to discharge in an impulse manner through the thyristor and the primary winding of the second pulse transformer PT2, so that high tension pulse is induced across the secondary winding of this transformer to be applied to the discharge tube Ld to initiate conduction. Thereupon, the flash discharge tube Ls becomes short-circuited by the discharge tube Ld, whereafter the discharge current from the capacitor C2 will be bypassed by the discharge tube Ld, thus interrupting the illumination of the flash discharge tube Ls. Simultaneously, the turning off of the transistor Tr1 deenergizes the electromagnet Mg, whereby the second blind is released to move, thus closing the shutter to terminate a photographing operation. Therefore, it will be seen that the illumination of the electronic flash is controlled by a shutter closing signal derived from the photometric circuit MC of a camera, and that a complete synchronization is assured since the electronic flash can be activated in the fully open condition of the shutter.

When a flashlight photographing by means of an electronic flash is attempted to take a picture of a man under counter-light, bright illumination, inconveniences may be caused such that the electronic flash fails to operate or a synchronized flashlight photographing is prevented if an arrangement is such that the photometric circuit MC supplies a shutter closing signal directly to the shutter control circuit SC, since in this instance the photometric circuit MC may produce a shutter closing signal before the shutter is fully open or the first blind has completed its movement, to thereby permit movement of second blind before the electronic flash is activated because the latter is adapted to be activated under the fully open condition of the shutter.

However, in accordance with the invention, the shutter closing signal produced by the photometric circuit MC is supplied to the shutter control circuit SC through the gate circuit GC, which passes the closing signal to the shutter control circuit SC only when the X contact SX is closed, so that even if the photometric circuit MC produced a shutter closing signal before the shutter is fully open, a closing movement of the shutter is not initiated and the illumination interrupt signal will not be supplied to the electronic flash until after the shutter becomes fully open to permit an activation of the electronic flash. Thus, a satisfactory synchronized photographing is assured as mentioned before even when a picture is taken of a man under counter-light, bright illumination.

If an electronic flash is not loaded on the camera, no inhibit signal will be fed from the electronic flash to the terminals a1 and a2, so that the transistor Tr4 normally remains off thereby causing the transistor Tr3 to normally remain on. In other words, a signal from the photometric circuit MC is passed through the gate circuit GC to the shutter control circuit SC any time, thus assuring a proper operation of the camera.

While the above embodiment deals with a single lens reflex camera of TTL type incorporating a photometric circuit which does not store a photometric value, a conventional bladed shutter employs a photometric circuit of the type which stores a photometric value, so that the invention can be equally applied to such cameras.

In this manner, in accordance with the invention, the photometric circuit of the camera can be used to provide a control of the illumination of a flash tube within an electronic flash, thus eliminating the need for a photometric circuit in the electronic flash while permitting the same effect to be achieved as that of a flashlight photographing using an adjusted strobo. Thus, a flashlight photographing operation with a proper amount of exposure is facilitated, and consequently the electronic flash used may be a compact and inexpensive one. In addition, the utilization of the photometric circuit of the camera is maximized.

Figure 10:
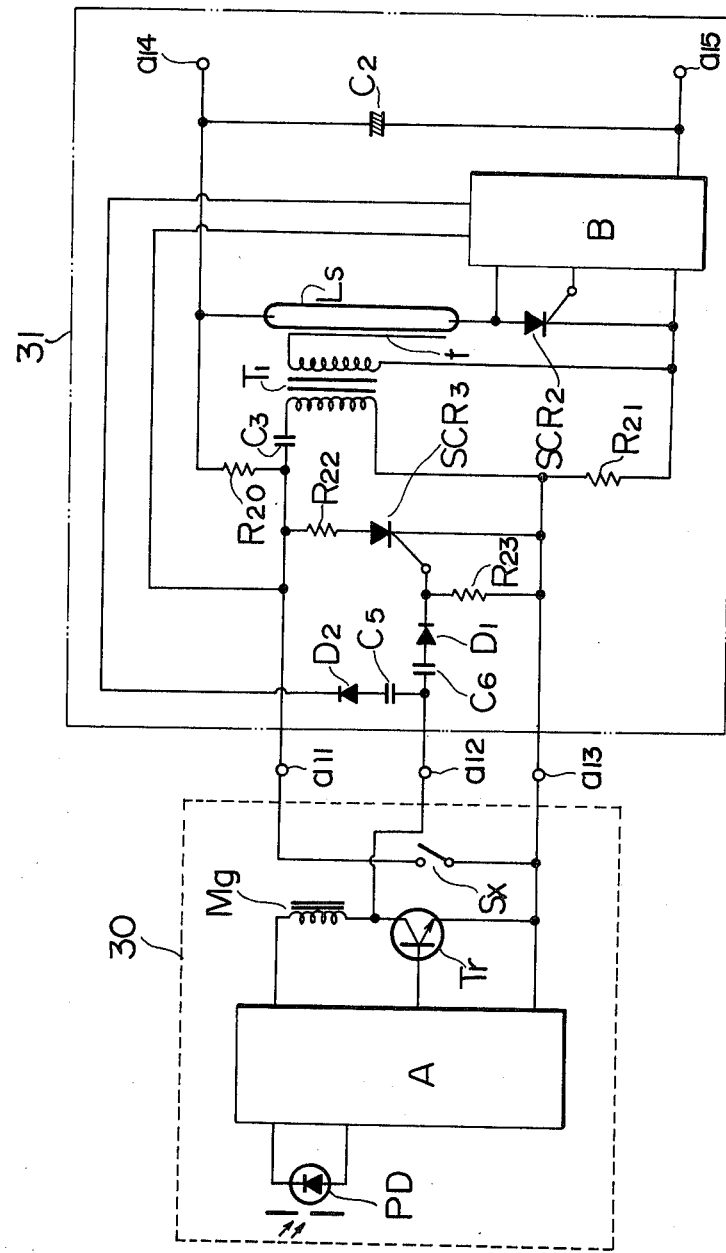
FIG. 10 is a circuit diagram showing another embodiment of the invention for synchronizing an electronic shutter with a camera in accordance with the invention.

The invention also provides an arrangement in which an electronic flash is prevented from emitting light when a given amount of exposure is reached by natural light before the illumination of the electronic flash should take place and in which the electronic flash is activated only when a given amount of exposure is not reached when the X contact is to be closed. Referring to FIG. 10, an electrical circuit shown within a box 30 indicated in broken lines represents an electronic shutter circuit provided on the part of an EE camera while an electrical circuit shown within a box 31 indicated in chain lines represents the principal part of an auto-strobo of a series controlled type. Both electrical circuits are electrically connected together throught connection terminals a11, a12 and a13. The electronic shutter includes a light receiving element PD which comprises a photoelectric transducer element such as a photodiode, phototransistor, silicon photocell or the like having a rapid response to a natural light (continuous light) as well as a flash from the strobo unit. The electronic shutter includes a block A of a conventional design and having its last stage formed by the series circuit comprising an electromagnet Mg for permitting the movement of the second blind and a switching transistor Tr. As before, the electromagnet Mg is energized by the conduction of the transistor Tr when the first blind initiates its movement upon shutter release, thereby constraining the second blind of the shutter from movement. When a proper amount of exposure is reached, the block A operates to turn off the transistor Tr, thereby deenergizing the solenoid to permit the second blink to move. The transistor Tr has its emitter connected with the connection terminal a13 and its collector connected with the connection terminal a12, while the X contact SX is connected beetween the connection terminals a11 and a13.

The main electrical circuit of the strobo unit comprises a main capacitor C2 connected across a pair of power supply terminals a14, a15; a series circuit comprising a flash discharge tube Ls and a thyristor SCR2 which are connected across the capacitor C2 through a conduction control circuit B for the thyristor SCR2; another series circuit connected across the first mentioned series circuit and comprising a resistor R20, a trigger capacitor C3, the primary winding of a triggering pulse transformer T1 and a resistor R21; a further series circuit comprising a current limiting resistor R22 and a thyristor SCR3 connected in series across the pair of connection terminals a11 and a13; an additional series circuit comprising a capacitor C6, diode D1 and resistor R23 connected across the pair of connection terminals a12 and a13; and a connection circuit including a capacitor C5 and diode D2 in series between the connection terminal a12 and the conduction control circuit B. The secondary coil of the triggering transformer T1 has its one end connected with a trigger electrode t and its other end connected with a cathode of the thyristor SCR2. The gate of the thyristor SCR2 is supplied with a firing voltage from the conduction control circuit B while the gate of the thyristor SCR3 is supplied with a firing voltage from the junction between the diode D1 and the resistor R23. The junction between the resistor R20 and the trigger capacitor C3 is connected with the connection terminal a11, which is also connected to the conduction control circuit B.

When an electronic flash is coupled with the electronic shutter, the light from the flash discharge tube Ls as reflected from an object being photographed is received by the element PD within the electronic shutter for processing within the electronic shutter circuit, and when a proper amount of the exposure has been reached, the electromagnet Mg is deenergized to permit the second blind of the shutter to start moving. Since the mechanical operation of the shutter blind is slower in operation than the time interval during which the electronic flash is activated, it is impossible to rely on the closing movement of the second blind alone in order to control the light from the electronic flash. In view of this, a release signal indicative of the deenergization of the electromagnet Mg is driven to be passed through a path including the capacitor C5 and diode D2 to be applied to the conduction control circuit B so as to interrupt the conduction of the thyristor SCR2, thus terminating the illumination of the flash discharge tube Ls. In this manner, a proper amount of exposure is assured.

In operation, if a given amount of exposure is reached by natural light before the strobo unit is to be activated, the block A produces a signal which permits the second blind to move immediately after the movement of the first blind, whereby the transistor Tr is turned off to deenergize the electromagnet Mg. This release signal is derived at the connection terminal a12 and applied through the capacitor C6 and diode D1 to the gate of the thyristor SCR3 as a firing voltage, thus rendering this thyristor conductive. The conduction of the thyristor SCR3 causes the trigger capacitor C3 to be discharged through the current limiting resistor R22. Consequently, even if the X contact SX is closed subsequently by the operation of the first blind, any voltage applied to the trigger electrode t will be insufficient to cause an illumination of the discharge tube Ls. If a release signal is obtained from the electromagnet Mg subsequent to the closure of the X contact SX, the charge on the trigger capacitor C3 will be discharged through the triggering transformer T1, and at the same time the thyristor SCR2 will be turned on, thereby initiating the illumination of the flash discharge tube Ls. However, this illumination will be immediately interrupted since simultaneously with the release signal from the electromagnet Mg, this signal will operate the control circuit B through the capacitor C5 and diode D2 to turn off the thyristor SCR2 in the manner mentioned previously.

In this manner, the invention assures a satisfactory synchronized flashlight photographing in any instance, including a synchronized photographing during daytime.

What is claimed is:

1. Apparatus for synchronizing an electronic flash means with a camera having a lens and a focal plane shutter comprising first and second movable shutter blinds;
    shutter release means for controlling a film exposure and comprising first means for moving said first blind to expose the film located at the focal plane of the camera and second means for moving said second blind to cover said film; settable exposure control means for operating said second means responsive to the operation of said first means wherein the movement of said second blind is determined by the exposure period setting;
    normally inoperative switch means including first and second means respectively controlled by said first and second blinds so that said switch means is driven to the operative state responsive to the first blind being fully opened to fully expose said film to light enetering through said lens and before said second blind is moved to begin covering said film;
    an electronic flash means including means coupled to said switch means for preventing operation of said flash means when said switch means is in the inoperative state.

2. The apparatus of claim 1 wherein said exposure control means includes means responsive to predetermined settings for operating said second means to move said second blind to begin covering the film before said first blind has completed uncovering the film; said switch means being adapted to prevent operation of said electronic flash means whenever said exposure control means is in any one of said predetermined settings.

3. The apparatus of claim 1 wherein said switch means comprises first and second normally open switches connected in a series;
   means responsive to the first blind having moved to fully expose the film in the focal plane to close said first switch;
   means normally maintaining said second switch closed during the time that said second blind is not moving and responsive to initiation of movement of said second blind to cover the film in the focal plane to open said second switch;
   said electronic flash means having means coupled across said series connected switches for inhibiting operation of the electronic flash means when either of said switches is open.

4. The apparatus of claim 1 wherein said switch means comprises a pair of independently movable contact blades;
   means responsive to the first blind having moved to fully expose film in the focal plane to move said first blade towards said second blade;
   means normally urging said second blade towards said first blade and being adapted to said second blade away from said first blade responsive to initiation of movement of said second blind to cover the film in the focal plane.

5. The apparatus of claim 4 wherein said blades are each formed of a resilient material and wherein said first blade is normally biased towards engagement with said first blade and said second blade is normally biased away from said first blade.

6. The apparatus of claim 5 wherein said means for moving said first blade comprises a first rotatable cam of generally circular shape and having a portion of reduced diameter engaging a portion of said first blade when said first blind is fully opened to move enable said first blade to move towards said second blade.

7. The apparatus of claim 6 wherein said means for moving said second blade comprises a second rotatable cam of generally circular shape and having a projection extending radially outward therefrom said projection engaging said second blade before said second blind has initiated movement to cover the film in said focal plane to urge said second blade towards the first blade and being moved away from said second blade to enable the second blade to be displaced from the first blade.

8. The apparatus of claim 3 wherein said means for closing said first switch comprises a gear having a projection for engaging and thereby closing the first switch when the first blind is fully opened.

9. The apparatus of claim 3 wherein the means for closing said second switch comprises a gear having a projection for engaging and thereby closing the second switch before the second blind initiates movement towards covering the film in the focal plane.

10. The apparatus of claim 6 wherein the means for moving the first blade further comprises a rotatable gear for rotating said first cam and for moving said first blade.

11. The apparatus of claim 7 wherein the means for moving the second blade further comprises a second rotatable fear for rotating said second cam and for moving said second blind.

* * * * *